April 3, 1973  R. H. HARRIS ET AL  3,725,263
WASTE WATER TREATMENT
Filed Dec. 15, 1970  2 Sheets-Sheet 1
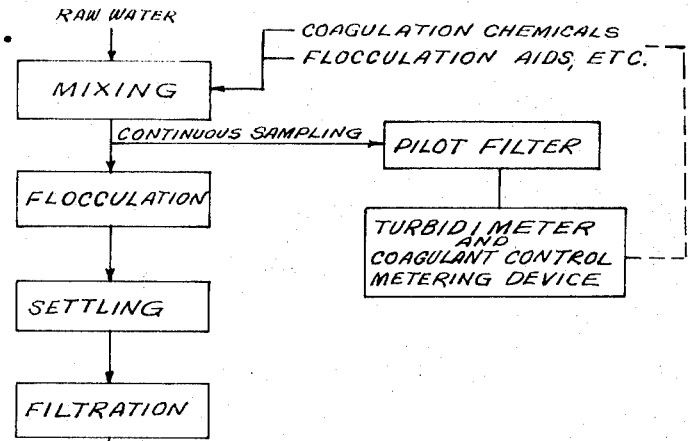
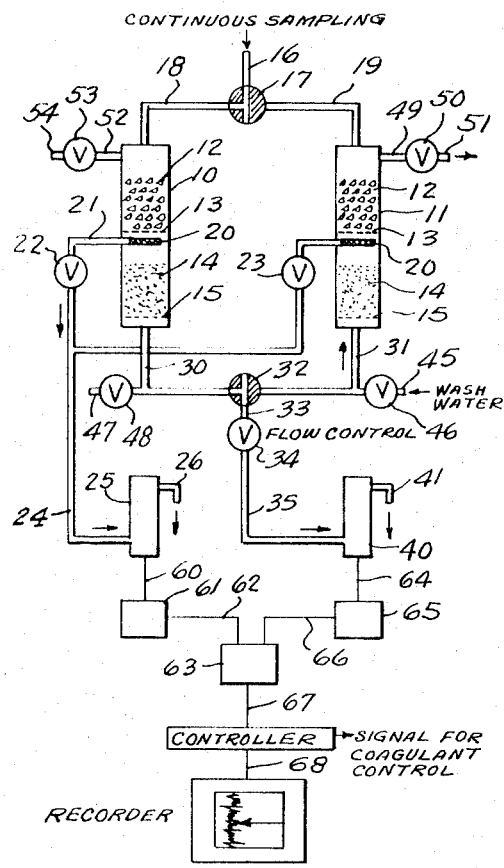
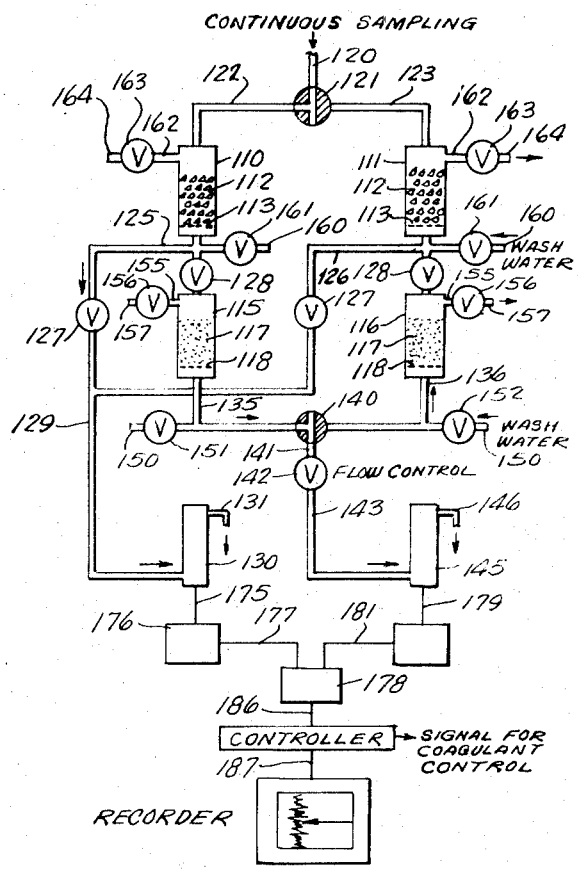
INVENTORS
ROBERT H. HARRIS,
EDWARD F. MOREY,
BY
Berman, Davidson & Berman
ATTORNEYS

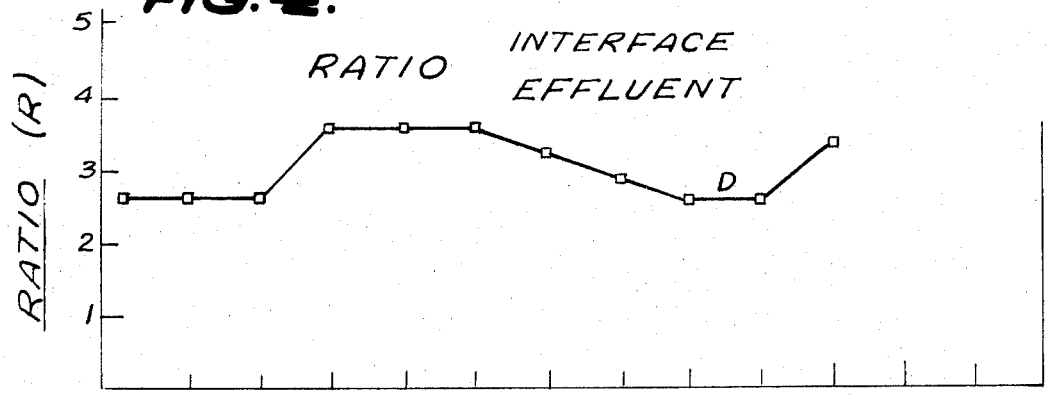
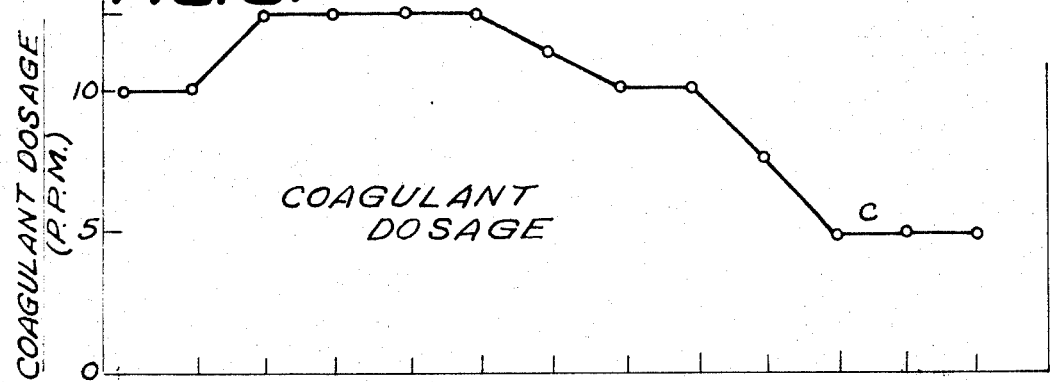
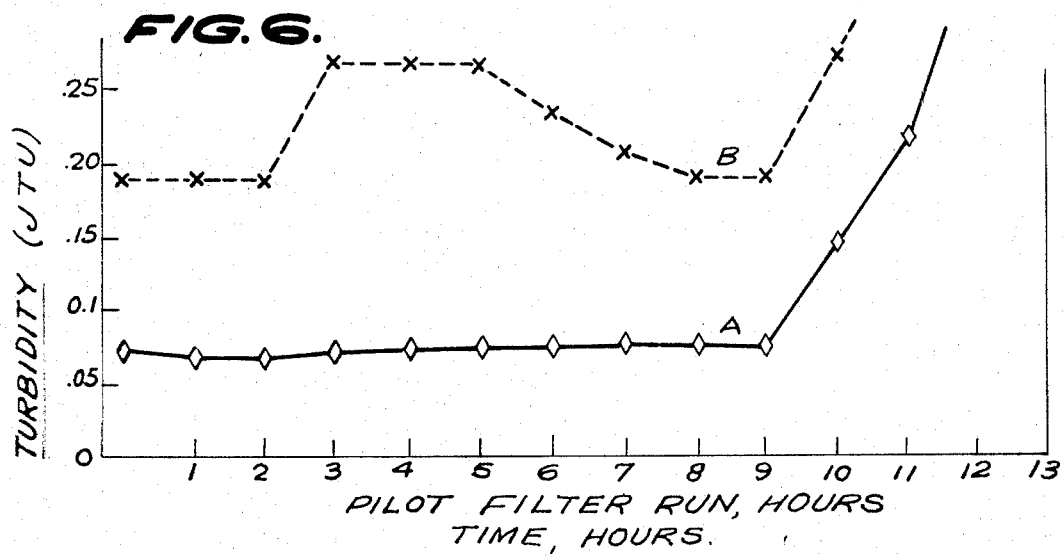

United States Patent Office 3,725,263
Patented Apr. 3, 1973

3,725,263
WASTE WATER TREATMENT
Robert H. Harris, Norcross, and Edward F. Morey, Atlanta, Ga. (both of 415 E. Paces Ferry Road, Atlanta, Ga. 30305)
Continuation-in-part of abandoned application Ser. No. 881,485, Dec. 2, 1969. This application Dec. 15, 1970, Ser. No. 98,444
Int. Cl. C02b 1/20
U.S. Cl. 210—42
14 Claims

ABSTRACT OF THE DISCLOSURE

The addition of clarification chemicals in a filtration process is precisely controlled by the continuous sampling of chemically treated unfiltered water passing through a coarse to fine media bed of a pilot filter device. The pilot filter device measures turbidity of water which passes at a point intermediate through the filter media bed and which leaves the filter as final effluent. By establishing and maintaining an optimum relationship of the intermediate and the effluent turbidities, the proper metering of clarification chemicals is readily achieved in that both underdose and overdose of chemicals is quickly detected.

---

This application is a continuation-in-part of our earlier application Ser. No. 881,485, filed Dec. 2, 1969, now abandoned.

The present invention relates to the filtration of waste water, and more specifically to a method and means for precisely and continuously controlling the addition of coagulating chemicals in a filtration process.

Modern, large scale, economically maintained water treatment procedures rely upon a series of integrated, closely controlled steps. In a typical procedure raw water, or clarifier effluent, as obtained from a river or lake source, or from a sewage or waste water treatment plant subsequent to primary solids separation and secondary biological treatment, is measured, admixed with clarification and pH adjustment reagents, subjected to a settling step to remove large, dense particles, and finally filtered to lower water turbidity to an acceptable level through removal of finely suspended impurities.

The addition of chemical clarification reagents represents a particularly difficult problem in the large scale treatment of raw water and waste water containing effluents such as encountered in tertiary treatment of sewage and waste waters. The addition of chemical clarification reagents, both of the inorganic and organic type, has frequently been controlled manually by a process of trial and error wherein the turbidity of the final filter effluent is observed, and more or less clarification reagents are added as indicated. Since the overall treatment process requires many hours from time of chemical addition to final filtration, considerable amounts of under or over treated water may leave the system before appropriate adjustment is made.

It has recently been suggested that a certain degree of more constant and contemporaneous control of chemical addition may be achieved by utilization of a pilot filter device. The pilot filter disclosed in the prior art continuously samples clarification chemically treated water immediately after addition of the chemical and tests the filterability thereof. By this procedure the pilot filter detects an underdose of clarification chemical within a few minutes after addition thereof. Accordingly, appropriate adjustment to the chemical addition rate may be made before substantial quantities of untreated water accumulates within the overall plant system and is permitted to pass therefrom.

While typical prior art pilot filter devices adequately serve to detect underdoses of treatment chemicals by detecting excess turbidity in the filter effluent passing therefrom, no satisfactory device has been developed for promptly detecting an overdose of water treatment chemicals.

It is therefore an object of the present invention to provide an improved method for controlling the addition of treatment chemicals in a filtration process wherein raw and waste water effluents are clarified.

It is another object to provide a pilot filter device which quickly and continuously detects the presence of both an underdose and overdose of clarification chemicals used in the large scale treatment of water.

It is a further object to provide a system which is readily adapted to continuously and automatically monitoring and controlling the addition of chemical coagulants and coagulation aids to water treated in conventional water and waste water treatment plants.

It is still a further object to provide an improved water filtration system wherein the addition of treatment chemicals is continuously controlled both with respect to underdose and overdose thereof.

These and still further objects of the present invention will become readily apparent to one skilled in the art from the detailed following description and drawings wherein:

FIG. 1 is a block diagram of a typical filtration system which utilizes a pilot filter device of the present invention.

FIG. 2 is a schematic diagram of one preferred configuration of the pilot filter control system of this invention.

FIG. 3 is a schematic diagram of an alternative preferred configuration of a pilot filter controlled system of the present invention.

FIGS. 4, 5 and 6 are a series of graphs which depict typical data obtained during operation of a treatment plant using the process and apparatus of the present invention.

Broadly, our invention contemplates an improved pilot filter apparatus which utilizes a coarse to fine mixed bed or dual bed filter media and which continuously monitors and compares the turbidity of chemically treated water passing through a point intermediate the length of the bed with the turbidity of water passing from the filter as final effluent in a water or waste water treatment plant.

More specifically, we have found that the proper dosage of clarification reagents may be constantly regulated within desired upper and lower limits by a process which involves the following steps:

(a) measuring the turbidity of water passing through a point intermediate along the length of a filter media bed of a pilot filter;

(b) measuring the turbidity of the filter effluent passing from the pilot filter;

(c) obtaining a relationship of the intermediate and effluent turbidities to obtain a working numerical relationship, which may be typically expressed as follows in terms of a ratio:

$$\frac{I}{E} = \frac{\text{turbidity reading at intermediate point}}{\text{turbidity reading of effluent}}$$

and;

(d) maintaining the optimum dosage of water treatment chemicals which will yield a desired relationship of turbidities as determined for a given filtration system.

The working numerical relationship between the turbidity reading at the filter media intermediate point (I) and the turbidity reading of the final filter effluent (E) may be conveniently expressed as a ratio $I/E$ as set forth above. Furthermore, the working numerical relationship may be expressed in other conventional ways such as a difference $I-E$, a sum $I+E$, a multiple $I \times E$, a derivative, and so forth. In other words, the turbidity data obtained from our novel method and apparatus may be handled or processed by any convenient system which will yield a variable readout by which the addition of treatment chemicals may be controlled.

Specifically, we have made the surprising finding that for a given water filtration system operating under a given set of conditions, our novel pilot filter may be used to determine an optimum level of clarification chemical addition. This level is easily and continuously maintained by monitoring the relationship of turbidity of water passing through an intermediate point and passing from the bed of a mixed or dual bed filter apparatus. The relationship of turbidities which is ideal for a given filtration system is that which corresponds to the minimum chemical addition which will yield the desired degree of clarification. As will be fully explained in the subsequent detailed description, the ideal turbidity relationship is readily determined by experiment for a given system and subsequent maintenance of the desired relationship is readily obtained by automatic means which control the addition of clarification chemicals to the filtration process.

The pilot filter used in the practice of the present invention contains a filter bed of the coarse to fine media type. That is, the portion of the bed media which is first contacted with the water to be filtered is of larger particle size than the media through which the water last passes. The media bed may be arranged as a "mixed" or "dual" bed. A mixed bed is one in which the type of media particles are intermixed and the particle size gradually vary from coarse to fine along the length of the bed. A dual media bed is arranged in two (or more) distinct layers according to type of media. For example, in a typical dual media bed a layer of silica sand may support an upper layer of anthracite, and a distinct media interface is formed at the point where the beds meet (or are separated).

It is to be understood that the pilot filter used in the practice of the present invention may utilize a mixed or dual bed. The sample of water taken at the point intermediate the length of the pilot filter bed may be within the center half or preferably at about the midpoint of the mixed media bed, and in the case of the dual media bed, the intermediate sample is preferably taken at the interface of the media beds.

In the present detailed description and drawings a dual media pilot filter apparatus is shown, however, a mixed media bed may well be substituted. Furthermore, in the detailed description, water is referred to as the treated fluid. The same process and apparatus may be utilized in the treatment of any waste water and effluent obtained from the treatment of domestic sewage and plant waste. In particular, the present method may be applied in the tertiary treatment of sewage wherein primary solid removal and secondly, biological treatment produces a clarifier effluent suitable for final tertiary treatment with coagulation chemicals.

Referring to the drawings, FIG. 1 is a block drawing which illustrates a typical water filtration procedure which is conducted using the novel pilot filter control means of the present invention. In FIG. 1, it is seen that raw water enters a mixing zone wherein coagulation chemicals and flocculation aids, as well as pH adjustment reagents, are added to the raw water. At this point, the raw water and additives are thoroughly mixed using mechanical means. The raw water which has been mixed with the clarification chemicals is continuously sampled, the sample being continuously conducted to a pilot filter. The pilot filter which represents the apparatus of the present invention, comprises a dual media filter apparatus equipped with appropriate turbidity monitoring devices and controls for chemical addition more clearly depicted in FIGS. 2 and 3 below.

Still referring to FIG. 1, the water which is mixed with clarification chemicals which is continuously sampled by the product filter, passes through a flocculation stage wherein agglomeration of the turbidity inducing particles as promoted by the presence of the clarification chemicals occurs. Subsequent to flocculation, the water passes into a settling zone wherein the larger more dense agglomerates settle from the water by gravity. Water removed from the settling zone by decantation is then subjected to a conventional filtration step wherein the remaining turbidity-inducing particles are finally removed. The filtration operation is typically conducted using modern high rate filter beds which normally comprise a plurality of filter media superimposed over each other. Typically, the bed may comprise a first filter media of anthracite having a particle size of 0.8 to 2 millimeters. Beneath the layer of anthracite a more dense filter bed was located which may typically comprise sand having a particle size on the order of 0.2 to 0.6 millimeter.

Referring to FIG. 2 which represents a schematic diagram of one configuration of the pilot filter apparatus of the present invention, it is seen that the apparatus possesses two parallel filter columns 10 and 11. The filter columns 10 and 11 are packed with an upper coarse media 12 which is retained upon screens 13. Below the upper media 12, lower finely divided media 14 is maintained on retainer screens 15.

A continuous sampling of treated water enters the apparatus through conduit 16 and the passage thereof is regulated to either column 10 or 11 by means of a three-way valve 17. Leading from the valve 17, conduit 18 delivers water to column 10 whereas conduit 19 delivers water to column 11.

Maintained within the columns 10 and 11 are interface sampling tubes 20 located between the upper coarse media 12 and the lower fine media 14. Sampling tubes 20 are connected by way of conduit 21 to interface sample control valves 22 and 23 which are interconnected with columns 10 and 11, respectively. The flow of water through valves 22 and 23 is received by conduit 24 which leads to interface turbidity measuring device 25. The interface turbidity measuring device 25 is equipped with a drain tube 26 wherein water passing therefrom is conducted to waste. Located at the bottom of the columns 10 and 11 are final effluent collector pipes 30 and 31, respectively. The flow through the pipes 30 and 31 is controlled by way of three-way valve 32 which selectively exits into conduit 33. The flow through conduit 33 is regulated by flow control valve 34 which exits into conduit 35 which, in turn, leads to final effluent turbidity measuring device 40. The turbidity measuring device 40 is provided with drain tube 41 which carries water passing therethrough to an appropriate drain.

Associated with final effluent pipes 30 and 31 is wash water control valve 46 which is connected to a source of wash water by way of conduit 45. Likewise, final effluent pipe 30 is associated with wash water control valve 48 and wash water conduit 47.

At the top of column 10 and entering therein is wash water drain conduit 49, the flow through which is controlled by valve 50 which exits into drain conduit 51. Likewise column 10 is provided with wash water exit conduit 52, control valve 53 and drain conduit 54.

Associated with the interface turbidity measuring device 25 is connector 60 which connects the output of the turbidity measuring device to a read-out device 61 which indicates the turbidity of the interface water sample. The read-out device 61 is connected by way of conductor 62 to a computer device 63. In a similar manner, the final effluent turbidity measuring device 40 is connected by way of conductor 64, to a final effluent read-out device 65 which, in turn, is connected to the computer device 63 by way of a connector 66. The computer device 63 possesses ability to compare the turbidity read-outs from the effluent turbidity determining device 25 and the final effluent determining device 40 and provides a ratio of these outputs. The ratio output of computer 63 is conducted by way of a connector 67 to a controller shown as a box in FIG. 2, which in turn is connected by way of connector 68 to a recorder mechanism. It is noted that the controller provides a signal for coagulant control which controls the addition of water clarification chemicals to the mixing step as shown in FIG. 1.

Referring to FIG. 3 wherein an alternative pilot filter configuration of the present invention as shown, it is seen that two parallel coarse media filter columns 110 and 111 are filled with coarse media 112 which is retained upon coarse media retention screens 113. Located below the coarse media columns 110 and 111 are fine media columns 115 and 116 which are filled with fine media 117 which is retained upon media retention screens 118. The columns 110 and 111 are connected to a source of sample water by means of sample conduit 120, three-way valve 121 and conduits 122 and 123.

Located at the bottom of columns 110 and 111 are interface sampling conduits 125 and 126, respectively. The flow of the interface samples through the conduits 125 and 126 are regulated by valves 127. The flow through the interface sampling conduits 125 and 126 to the fine media columns 115 and 116 is controlled by valves 128. From valves 127 which may be alternatively operated, the interface sample proceeds down conduit 129 to interface turbidity determining means 130 and finally through drain conduit 131. Located at the bottoms of columns 115 and 116 are final effluent conduits 135 and 136. The flow from these conduits is partially controlled by three-way valve 140, which alternatively controls the flow therefrom by way of conduit 141 and flow control valve 142 through conduit 143 to a final effluent turbidity determining device 145. The turbidity determining device 145 is provided with drain conduit 146.

Also entering the final effluent conduits 135 and 136 are wash water conduits 150 controlled by wash water control valves 151 and 152. At the top of columns 115 and 116 wash water exit tubes 155 as controlled by wash water exit control valve 156 through drain conduit 157, provide means for removing wash water from the columns 115 and 116.

The coarse media columns 110 and 111 are provided with wash water inlet conduits 160, the flow through which is controlled by valves 161. Wash water emerging from the top of columns 110 and 111 emerges through conduits 162 as controlled by valves 163 which exit through drain conduits 164.

At the bottom of FIG. 3, the interface turbidity determining device 130 is connected by way of connector 175 to interface turbidity read-out 176. The read-out device 176 is connected by way of connector 177 to computer means 178. Likewise, the final effluent turbidity determining device 145 is connected by way of connector 179 to read out final effluent turbidity device 180 which, in turn, is connected to the computer device 178 by means of connector 181. The computer means 178, which is capable of determining a ratio of the turbidities of the interface sample to the final effluent sample, is connected to a controller by way of connector 186. From the controller, the connector 187 provides an output for the recorder device shown in the diagram.

In the operation of the apparatus shown in FIG. 2, it is seen that a continuous water sample obtained from a water filtration system subsequent to mixing with coagulation chemicals as shown in FIG. 1 is directed to either column 10 or 11 by means of three-way valve 17. As shown in the figure, the water sample passes through the valve 17 into column 10 by way of conduit 18. The water sample is first subjected to the filtering action of the coarse media layer 12. Subsequent to passing through the coarse media, the water sample passes through the interface between the coarse media 12 and the fine media 14. A sample of this interface water is taken through sampling tube 20 which, in turn, passes through the conduit 21, control valve 22 and conduit 24 to the turbidity determining device 25. Subsequent to determining its turbidity, the sample exits from the turbidity determining device 25 by way of drain conduit 26.

After passing the interface point, the water sample passes through the fine media 14 and is collected at the bottom of the column in pipe 30. The flow from pipe 30 is controlled by way of three-way valve 32 into the final effluent turbidity determining device 40. In device 40, the turbidity of the final effluent is determined and the effluent then passes through conduit 41 to a suitable drain. The operation of the device of FIG. 2, subsequent to determining the turbidity of the interface effluent and the final effluent, involves collecting the signals obtained from the turbidity determining devices 25 and 40 after passing through a read-out device 61 or 65 into the computer device 63. The device 63 is capable of comparing the signals derived from the turbidity determining devices 25 and 26, and establishing a ratio of these signals. This ratio, which may be indicated as a working numerical ratio, is then fed to an appropriate controller which will control the addition of coagulation chemicals added to the overall treatment system. As an optional element, the recorder device shown in the diagram may be used to conveniently record the ratio of outputs of the turbidity determining devices 25 and 40. The means by which the ratio of the turbidities of the interface sample to the final effluent sample is applied in the operation of an overall filtration plant, will be subsequently explained in conjunction with an explanation of the data portrayed in the graphs in FIGS. 4, 5 and 6.

The apparatus of FIG. 2 is provided with two columns 10 and 11 which may be alternatively individually operated to provide continuous operation while one column is being back-flushed. After an operation cycle of from about 1½ to 4 hours, it is found that the media of the operating column becomes filled with foreign material which must be removed during a back-flush cycle. It will be noted that the apparatus of FIG. 2 is provided with wash-water conduits 45 and 47 which admit wash-water under pressure into the bottom of columns 10 and 11 as controlled by valves 46 and 48. By the location of three-way valves 17 and 32 in FIG. 2, it is observed that the column 10 is currently in a filtration part of a cycle. Column 11 which is not in the filtration cycle, may be back-flushed by opening valve 46 which permits wash water to enter column 12 by way of pipe 31. The wash water then back flushes column 12 and exits through conduit 49 by way of valve 50 which is maintained in an open position during the flushing cycle. Likewise, during the flushing cycle, valve 23 which controls the flow of interface sample water is maintained in a closed position. It will be readily understood by one skilled in the art, columns 10 and 11 may be readily exchanged from a back flush to a filtration position within the cycle by appropriate manipulation of three-way valves 17 and 32 in conjunction with appropriate operation of the wash water valves.

Refering to FIG. 3, it is seen that an alternative prefered construction of the pilot filter apparatus is portrayed. Apparatus of FIG. 3 and its operation is similar to that of FIG. 2; however, it is observed that the filtration columns are divided into two separate containers for coarse and fine media. The interface sample is taken from a pipe connection existing between columns 110 and 115. Likewise pipe connection shown as 126 removes the interface sample from between coarse and fine media columns 111 and 116. The collection of turbidity data and the operation of the apparatus of FIG. 3 is similar to that described in FIG. 2.

In the operation of the device shown in FIG. 3, the water sample enters conduit 120, and as shown in FIG. 3, is directed by three-way valve 121 to column 110. The water sample passes through the coarse media 112 of column 110 and exits through conduit 125. Conduit 125 branches. One branch passes through the valve 128 and then through the fine media column 115. The other branch of conduit 125 passes through valve 127 and conduit 129 to turbidity measuring device 130. The portion of sample water passing through valve 128 and fine media containing column 115 exits through conduit 135 and then by way of three-way valve 140 to the effluent turbidity measuring device 145. Therefore, in the device shown in FIG. 3, the interface water sample is taken by way of branch conduit 125 to the interface determining turbidity measuring device 130, whereas the final effluent turbidity is measured by device 145. Signals from the turbidity measuring devices 130 and 145 are then conducted to read-out devices 176 and 180, respectively, and then to computer device 178 which computes a ratio of interface turbidity provided by the final effluent turbidity. This signal is transmitted to the controller which provides a signal for coagulant control, and also provides a signal which is recorded in the recorder device shown at the bottom of the figure.

To better understand the workings of the presently described pilot filter apparatus in conjunction with the operation of an actual water filtration system, the following specific example is provided.

EXAMPLE

A water filtration system having a capacity of 1 million gallons per hour and which utilized the steps of mixing, flocculaiton, settling and filtration generally shown in FIG. 1 was operated over a period of 12 hours to obtain the data displayed in FIGS. 4, 5 and 6. The filtration system utilized alum as a coagulant and the water treated possessed an initial turbidity of 15 JTU. The system was provided with a continuous sampling pilot filter device which is shown in FIG. 2. The filtration system utilized a multibed filter of which the first or coarse bed was anthracite and the second or fine bed was sand. The pilot filter apparatus utilized a similar dual bed filter wherein the coarse bed was anthracite having a particle size on the order of 1.0 millimeter and the fine or second bed was sand having a particle size on the order of 0.45 millimeter.

The pilot filter apparatus was operated in a manner wherein a continuous sampling of 2½ gallons per minute was passed through the device. Of this total (2½ gallons per minute), ¼ gallon per minute were withdrawn through the interface sampling tube 20 and the remainder passed through the device as final filter effluent. As shown in FIG. 6, the turbidity of the interface effluent was plotted as a function of time (shown as broken line curve B). In FIG. 6, the solid line curve A represents the simultaneously determined final filter effluent turbidity plotted as a function of time.

FIG. 4 represents data wherein the ratio of interface effluent to final filter effluent, that is the value shown in FIG. 6 as curve B, divided by the value of curve A, is being plotted as a function of the same time period.

FIG. 5 represents a simultaneous period wherein the coagulant dosage (alum), added to the filtration system during the mixing procedure, is added in amounts as indicated in parts per million.

Observing curve A in FIG. 6 for the time period of the test, it is noted that the curve, that is the turbidity, of the final pilot filter effluent is essentially flat for the first nine hours. It is also observed that the turbidity of the interface water sample plotted as curve B is constant for the first two hours, however, increases substantially during the next three hour period. It is further noted that the ratio of the interface divided by the effluent turbidity as expressed in FIG. 4 also is constant for the first two hours, and is significantly increased for the next three hours.

Reference to FIG. 5 reveals that the coagulant dosage which was initially ten parts per million during the first hour of operation was significantly increased to about 12 parts per million during the next four hours of operation. This increases in coagulant dosage from 10 to 12 parts per million, however, did not significantly lower the turbidity of the final filter effluent shown in curve A of FIG. 6. This indicates for the period starting from about the second hour of operation an overdose of coagulant chemical was applied to the filtration system. This becomes evident by the fact that the increase in dose did not decrease or provide a corresponding decrease of turbidity in the final filter effluent shown in curve A. Correspondingly, it is found that the final filter effluent emerging from the overall filtration plant did not significantly decrease, and accordingly indicated an overdose of coagulant chemicals.

Referring again to FIG. 4, it is seen that the ratio of interface to final filter effluent turbidities as plotted thereon indicates that, during the first two hours of operation, the coagulant dosage was substantially correct for the system in question. That is, only ten parts per million of coagulant chemicals as shown in FIG. 5 produced a desired level of turbidity in the final filter effluent of approximately 0.07 as indicated in FIG. 6. However, it is observed that when an overdose of coagulant chemicals to the extent of about two parts per million was added to the system as shown in FIG. 5, a significant increase in the interface to effluent ratio occurred as shown in FIG. 4; that is, an overdose of two parts per million provided a numerical ratio increase of approximately one unit as shown in FIG. 4. This increase is readily transmitted to an automatic coagulant dosage metering device and an appropriate connection promptly made.

During the test run illustrated in the data set forth in FIGS. 5 and 6, it is seen that subsequent to the fifth hour the coagulant dosage is progressively decreased from 12 parts per million down to about 5 parts per million. This decrease in coagulant dosage is reflected by a turbidity decrease of the interface effluent shown in curve B of FIG. 6. It is shown that the value of curve B decreases to approximately 0.18 while the turbidity value for curve A remains essentially constant. Subsequently, after about hour nine or ten, at which point the coagulant dosage had been applied at the rate of five parts per million, the value of curve A (that is, the turbidity of the final effluent), increases substantially above an accepted level. FIG. 4 indicates that as the coagulant dosage is decreased to an acceptable level of about 10 parts per million, the ratio of interface to effluent turbidities decreases to about 2.5. When the value of the final effluent rises above the desired level, the magnitude of the signal from the computer device 63 as shown in FIG. 2 is increased to a level whereat the controller will make an appropriate correction for the required increase in coagulant dosage.

The pilot filter apparatus such as shown in FIG. 2 was operated for approximately two hours using column 10, after which column 10 was back-flushed and column 11 was placed into operation for a similar period. By appropriate cycling, it is seen that the sampling and coagulant control is substantially continuous.

While the above specific example was operated using alum as the water clarification chemical, similar results were obtained with other water clarification chemicals such as ferric sulfate, and organic polymers were utilized in lieu, or in addition to, alum. Likewise, it is understood that numerous filter media may be utilized in the primary filtration plant filters, as well as in the pilot filter apparatus. The filtration media used in the plant filters and the pilot filters may not necessarily constitute the same materials, nor the same particles size distribution. Typical materials which may be utilized in both the pilot filter beds and in the plant filter beds include anthracite coal, silica sand, glass beads, activated carbon granules, ilmenite and garnet.

The above explanation and specific example clearly indicate that the presently disclosed method and apparatus provide a means for precisely and continuously controlling the addition of water clarification chemicals in a water filtration process.

We claim:
1. A method for controlling the addition of clarification agents in a water or waste water filtration process which comprises:
   (a) obtaining a sample of water having water clarification agents added thereto prior to filtration,
   (b) passing the sample through a pilot filter having a coarse to fine media bed,
   (c) determining the turbidity of said sample passing through a point intermediate the length of said bed,
   (d) determining the turbidity of said sample passing through the filter as final effluent,
   (e) obtaining a numerical relationship which is proportional to the turbidities of said intermediate sample determined in step (c) and final effluent determined in step (d), and
   (f) controlling the addition of clarification agents to maintain said numerical relationship obtained in step (e) within desired predetermined limits.

2. The method of claim 1 wherein said bed is a dual media bed.

3. The method of claim 1 wherein said bed is a mixed media bed.

4. The method of claim 1 wherein said bed contains anthracite having a particle size of from 0.9 to 1.4 millimeters.

5. The method of claim 1 wherein said bed contains sand having a particle size of from about 0.4 to 0.7 millimeter.

6. The method of claim 1 wherein water clarification agents are added which are selected from the group consisting of inorganic and organic water clarification agents.

7. The method of claim 1 wherein the numerical relationship obtained in step (e) is that numerical ratio obtained by trial and error wherein the amount of water clarification agents is that which yields the minimum interface turbidity value commensurate with the maximum allowable final effluent turbidity value.

8. Apparatus for controlling the addition of water clarification agents in a water or waste water filtration system which comprises:
   (a) a pilot filter having a filter media bed in which flow passes from coarse to fine media,
   (b) a first turbidity detecting means to determine the turbidity of water passing a point intermediate the length of said media bed,
   (c) a second turbidity detecting means to determine the turbidity of water passing as final effluent from the pilot filter,
   (d) means to compute a numerical relationship of turbidities operably connected with said first and second turbidity detecting means and provide a detectable signal output proportional to said relationship and
   (e) a clarification agent metering means, said metering means being proportionately responsive to the magnitude of said signal output.

9. The apparatus of claim 8 wherein said filter media bed is a mixed or dual media bed containing particulate anthracite and sand.

10. The apparatus of claim 8 wherein said filter bed is maintained within a single column.

11. The apparatus of claim 8 wherein dual filter beds are maintained in different series connected columns.

12. The apparatus of claim 8 wherein the pilot filter is provided with back-flushing means.

13. The apparatus of claim 12 wherein a plurality of pilot filters are operably connected in parallel alternatively operating relationship.

14. The apparatus of claim 8 in combination with a water filtration system for use in water treatment and waste water treatment.

References Cited
UNITED STATES PATENTS

| | | | |
|---|---|---|---|
| 3,067,133 | 12/1962 | Conley, Jr., et al. | 210—53 X |
| 3,262,878 | 7/1966 | Beckley et al. | 210—53 |
| 3,393,149 | 7/1968 | Conley et al. | 210—42 |
| 3,618,766 | 11/1971 | Morey | 210—96 X |
| 3,171,800 | 3/1965 | Rice et al. | 210—53 X |
| 3,171,801 | 3/1965 | Rice et al. | 210—53 X |
| 3,462,364 | 8/1969 | Carlson | 210—42 |

SAMIH N. ZAHARNA, Primary Examiner

T. G. WYSE, Assistant Examiner

U.S. Cl. X.R.

210—96